United States Patent [19]

Moirez

[11] 4,249,792
[45] Feb. 10, 1981

[54] OPTICAL OBSERVATION INSTRUMENT WITH FIBER OPTIC IMAGE STABILIZER

[75] Inventor: Jacques Moirez, Paris, France

[73] Assignee: Societe d'Optique, Precision Electronique et Mecanique Sopelem, Paris, France

[21] Appl. No.: 22,512

[22] Filed: Mar. 21, 1979

[30] Foreign Application Priority Data

Apr. 3, 1978 [FR] France ............................. 78 097290

[51] Int. Cl.³ ...................... G02B 23/00; G02B 5/17
[52] U.S. Cl. .................................... 350/16; 350/96.25
[58] Field of Search ................... 350/16, 96.25, 96.27; 33/230, 236; 354/70

[56] References Cited

U.S. PATENT DOCUMENTS

| 3,504,957 | 4/1970 | Heflinger et al. | 350/16 |
| 3,531,176 | 9/1970 | Humphrey | 350/16 |
| 3,608,995 | 9/1971 | Humphrey | 350/16 |
| 3,653,307 | 4/1972 | De Heere et al. | 350/96.27 X |
| 3,728,948 | 4/1973 | Fraser | 350/16 X |
| 3,803,407 | 4/1974 | Anderson | 350/96.27 X |
| 3,807,869 | 4/1974 | Hartley | 350/16 X |
| 3,892,467 | 7/1975 | Shin | 350/16 |
| 3,910,693 | 10/1975 | De La Cierva | 350/16 X |
| 3,977,855 | 8/1976 | Cole | 350/96.25 X |
| 4,013,339 | 3/1977 | Ando et al. | 350/16 |

FOREIGN PATENT DOCUMENTS 2829191  1/1979  Fed. Rep. of Germany ............. 350/16

Primary Examiner—John K. Corbin
Assistant Examiner—John D. Lee
Attorney, Agent, or Firm—Haseltine and Lake

[57] ABSTRACT

An optical observation instrument including on the one hand a mounting in which are mounted a convergent objective lens and a convergent eyepiece and on the other hand a disc formed of optical fibers arranged so as to reverse the image given by the objective lens and connected to the mounting by way of an articulation and held in a stable position, the front face of this disc being substantially at the focus of this objective lens.

5 Claims, 2 Drawing Figures

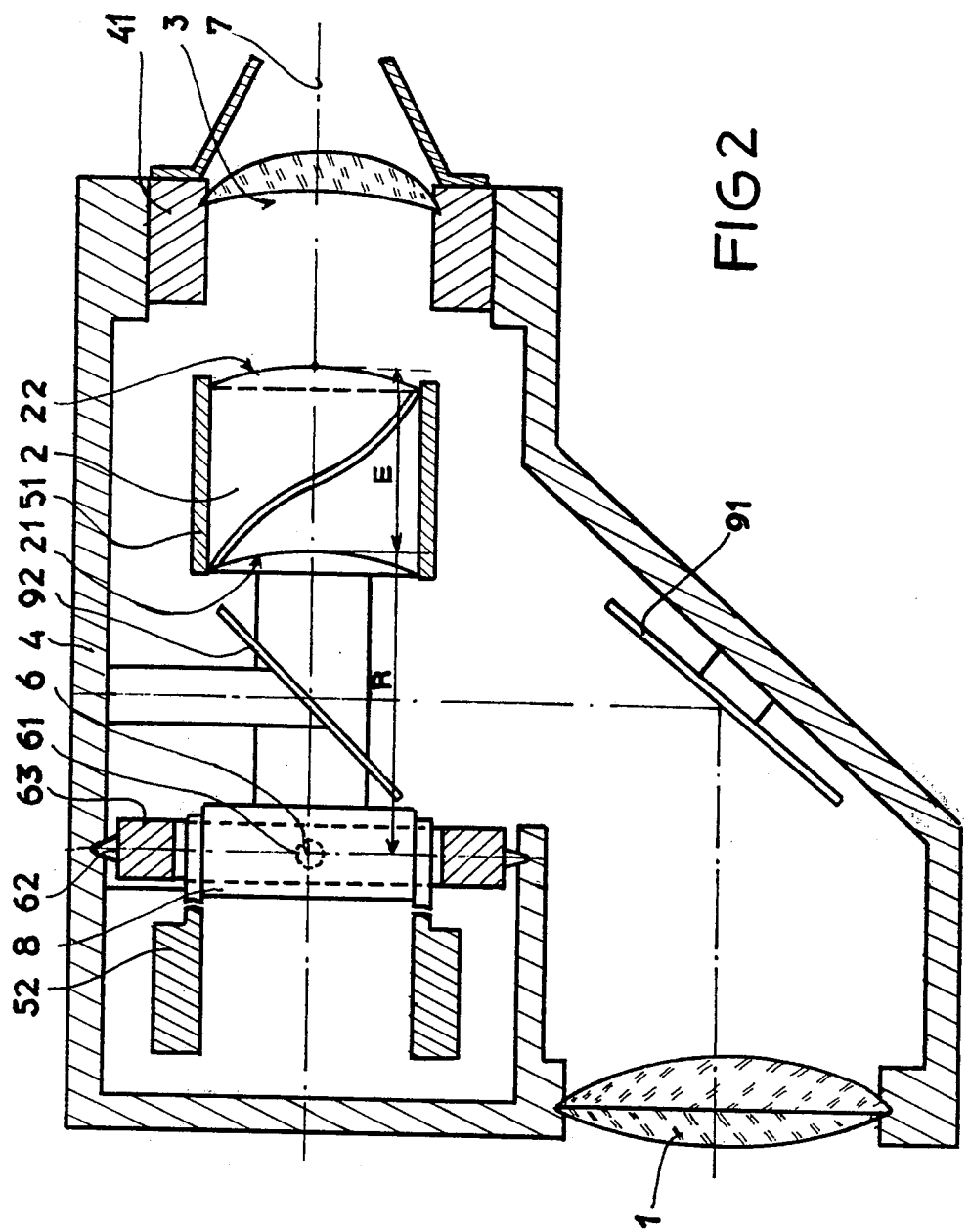

OPTICAL OBSERVATION INSTRUMENT WITH FIBER OPTIC IMAGE STABILIZER

SUMMARY OF THE INVENTION

The present invention relates to an optical observation instrument which gives of a remote object an upright and stable image in spite of the disturbing movements which it undergoes.

Observation carried out by means of an instrument having powerful enlargement is disturbed by the movements which this instrument undergoes. These movements may come from vibrations of mechanical origin when the instrument is mounted on a land, sea or air vehicle. These movements may also come from the observer's own movements if the latter is holding the instrument in the hand.

A system for stabilization of observation comprises an optical system which deflects the light beams and is connected to a control system which remains relatively motionless in space either because of its own inertia or because of a gyroscopic effect. The beam emerging from this deflecting optical system remains motionless with respect to the eyepiece. The incident beam shifts with respect to the eyepiece but the deflecting optical system is displaced by the control system so as to compensate for the displacement of the eyepiece. The deflecting optical system is arranged at a suitable point on the optical path.

Instruments exist in which in front of the eyepiece an optical system is located which is subordinated to a system of control for deflecting the light beams so as to keep them fixed with respect to the eyepiece. This optical system is in certain cases formed by a mirror which can pivot about an articulation. The angular position of the mirror is determined by a gyroscope which provides a reference direction, the connection between the mirror and the gyroscope being ensured by a system of levers which transmit the angles with a ratio of $\frac{1}{2}$. These instruments are relatively complicated. The optical system arranged in front of the eyepiece may in certain cases be formed by a system of prisms having variable angles.

Other instruments exist in which the optical system which deflects the light beams forms part of the optical system for observation. As previously, the deflecting optical system is manipulated so as to maintain the stability of the image. The deflecting optical system stabilized in space may be a lens movable perpendicularly to the optical axis. The deflecting optical system may be formed by a system of mirrors subject to a pendular device. The instruments of this category are compact and simple. Hence they are cheap and light and consequently portable by hand. The corrections which they can cause are, however, limited because of optical defects (geometrical aberrations or chromatism or lack of sharp focus) which increase with the movement of the deflecting optical system.

The instrument in accordance with the invention ensures erecting of the image given by the objective and provides a stable image. This stability is obtained without secondary optical defects. It is simply achieved and the instrument is compact.

The instrument in accordance with the invention includes on the one hand a mounting in which are mounted a convergent objective lens and a convergent eyepiece and on the other hand an optical member which is connected to the mounting by way of an articulation and is held in a stable position and it is characterized by the fact that this optical member consists of a disc formed of optical fibers arranged so as to reverse the image given by the objective and the front face of which is substantially at the focus of this objective.

In accordance with another characteristic of the invention the articulation of the disc is about a point and the disc has a front face and a rear face which are spherical and centered upon the center of this articulation.

In accordance with another characteristic of the invention, the center of articulation is located in front of the disc at a distance substantially equal to half the difference between the focal length of the objective and the thickness of this disc.

The invention will now be described in greater detail by referring to embodiments given by way of examples and represented by the attached drawings.

BRIEF DESCRIPTION OF THE DRAWINGS

FIG. 2 represents in section another embodiment of the instrument in which a gyroscope ensures the stabilization of the disc of optical fibers.

DETAILED DESCRIPTION

Figure 1:
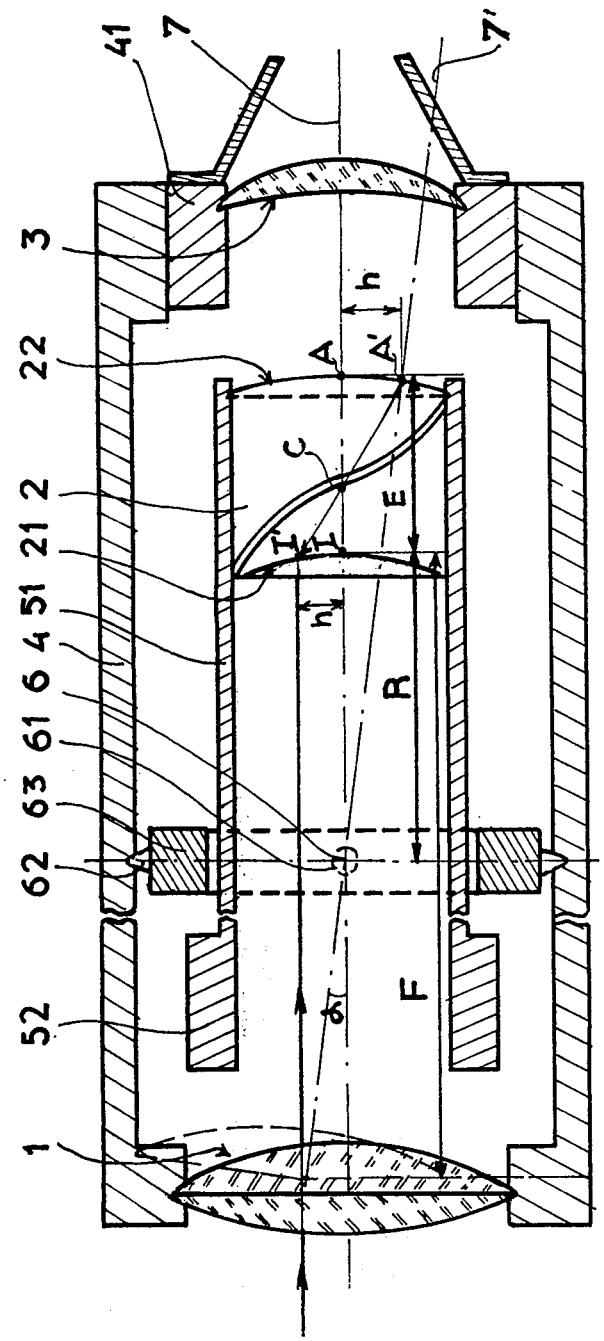
FIG. 1 represents in section an embodiment of the instrument in which inertia ensures the stabilization of the disc of optical fibers.

The instruments represented in FIGS. 1 and 2 comprise a convergent objective lens 1 and a convergent eyepiece 3. This objective lens and this eyepiece are mounted in a mounting 4. The optical axis 7 passes through the optical centers of the objective lens and the eyepiece. The eyepiece 3 is mounted in a tube 41 which can slide along the optical axis. This eyepiece might be replaced by a binocular.

An optical member 2 is arranged between the objective lens and the eyepiece. This optical member consists of an image transmission disc, known in itself. This disc is composed of optical fibers and forms a front face 21 facing the objective lens and the incident light and a rear face 22 facing the eyepiece 3. The disc consists of a large number of optical fibers of small dimensions consisting each of a core of high refractive index surrounded by a sheath of lower refractive index. These fibers are combined so as to form a compact assembly. Each optical fiber has one end terminating at the front face 21 and one end terminating at the rear face 22, the light being transmitted from the face 21 towards the face 22. The fibers are spiralled so that each fiber has one of its ends substantially symmetrical with the other end with respect to the center C of the disc. The disc provides on the rear face 22 an image reversed with respect to the incident image arriving on the front input face 21. The disc 2 is mounted so that the image plane of the objective lens coincides substantially with the input face 21 or else so that this face is substantially at the image focus of this objective lens. The objective lens 1 forms of a remote object a real image which is reversed and located in its image focal plane and on the input face 21 of the optical disc. The disc yields from this reversed image an upright image. This image is observed through the eyepiece 3 which acts as a magnifying glass and yields an enlarged upright virtual image. Fine adjustment is effected by movement of the eyepiece 3. It will of course be advantageous if the rear face 22 of the disc coincides substantially with the object focal plane of the eyepiece, the instrument then being afocal.

The disc 2 is joined to the mounting by way of an articulation which gives it two degrees of freedom while holding it substantially fixed along the optical axis 7. The disc can pivot with respect to the mounting about the point 6 located on the optical axis of the instrument between the front face of this disc and the objective lens. This articulation is preferably an articulation of the gimbal type. For this purpose the bearer frame 51 integral with the disc is joined by an articulation on the axis 61 to a frame 63 which is in turn joined by an articulation on the axis 62 to the mounting 4, the axis 62 being perpendicular to the axis 61.

The mass of the disc 2 is balanced with respect to the point of articulation 6 by means of a balance mass 52. The disc can thus remain in a fixed position.

The axis passing through the center C of the disc and the center of articulation 6 is fixed in Galilean space by suitable means in spite of the movement of the instrument.

In the embodiment as FIG. 1, the immobilization of the disc is ensured by the inertia of the mass of the disc and of the adjoining members. Friction due to the articulation must be low.

In the embodiment as FIG. 2, the immobilization is ensured by a gyroscope 8 mounted to be directly integral with the bearer frame 51. The image given by the objective lens is reflected by mirrors 91 and 92 integral with the mounting of the objective lens and located between the disc and the gyroscope.

The front face 21 and the rear face 22 of the disc are spherical faces centered upon the center 6 of the articulation which is located in front of this face 21.

Furthermore the objective lens exhibits a field curvature having substantially the same radius as that of the front face 21 of the disc. This curvature of course turns its concavity like the face 21 towards the front, that is to say, towards the incident light. The eyepiece exhibits a field curvature having substantially the same radius as that of the rear face 22 of the disc. This curvature of course turns its concavity towards the front, that is to say, towards the incident light.

The center 6 of the articulation is located in front of the disc at a distance R which corresponds with the radius of the face 21 and which is substantially equal to half the difference between the focal length F of the objective and the central thickness E of this disc. F, R and E are hence connected by the relationship $R = \frac{1}{2}(F-E)$.

The operation of the instrument will now be explained. Let us suppose that the whole of the telescope (including the observer) turns about the point 6, the axis of the optical disc remaining fixed. The axis of the telescope turns by an angle $\alpha$ and comes into the position 7'.

The axis of the optical disc is maintained along the initial axis 7. The image I of a distant point—originally located on the optical axis—comes to I', at a distance h from the old optical axis such that $h = (F-R) \tan \alpha$. The image point I corresponds at the output from the optical disc with the image point A located on the axis 7. The image point I' corresponds at the output from the optical disc with the image point A'. This point A' is located at a distance h from the axis 7 and from the point A because the point A' is substantially symmetrical with I' with respect to the center of the optical disc. The point of intersection of the axis 7' with the output face of the disc is located with respect to the axis 7 at a distance $(R+E) \tan \alpha$. Now, as E is connected with F and R by the relationship $E = F-2R$, the distance of this point of intersection with respect to 7 will be $(F-R) \tan \alpha$. This point of intersection will be located at the same distance from the axis 7 as the image A' which is tantamount to saying that the image A' will be on the axis 7'. The image originally located on the optical axis 7 hence appears to the observer to be located on the new optical axis 7'. Hence the image remains stable.

Of course without departing from the scope of the invention variants and improvements in detail may be conceived of and the use of equivalent means be envisaged.

What is claimed is:

1. An optical observation instrument comprising a mounting, a convergent objective lens and a convergent eyepiece supported in said mounting, a bearer frame integral with a disc of optical fibers arranged so as to provide on the output face an image reversed with respect to the incident image on the input face, a gimbal type articulation connecting said bearer frame and disc to said mounting, the front face of said disc being substantially at the focus of said objective lens, said articulation being located in front of said disc at a distance substantially equal to half the difference between the focal length of the objective lens and the thickness of the disc, and means for retaining the disc in a stable position.

2. An instrument as in claim 1, in which the front face and the rear face of the disc are spherical and centered upon the center of said articulation.

3. An instrument as in claim 2, in which the objective lens exhibits a field curvature having substantially the same radius as the front face of the disc of optical fibers and the eyepiece exhibits a field curvature having substantially the same radius as the rear face of the disc.

4. An instrument as in claim 1 or claim 2, further comprising means for balancing the mass of the disc of optical fibers with respect to its point of articulation.

5. An instrument as in claim 1 or claim 2 or claim 3, comprising a gyroscope mounted integral with the bearer frame and mirrors integral with the mounting and located between the disc and the gyroscope so as to reflect the image given by the objective.

* * * * *